United States Patent Office 3,531,065
Patented Sept. 29, 1970

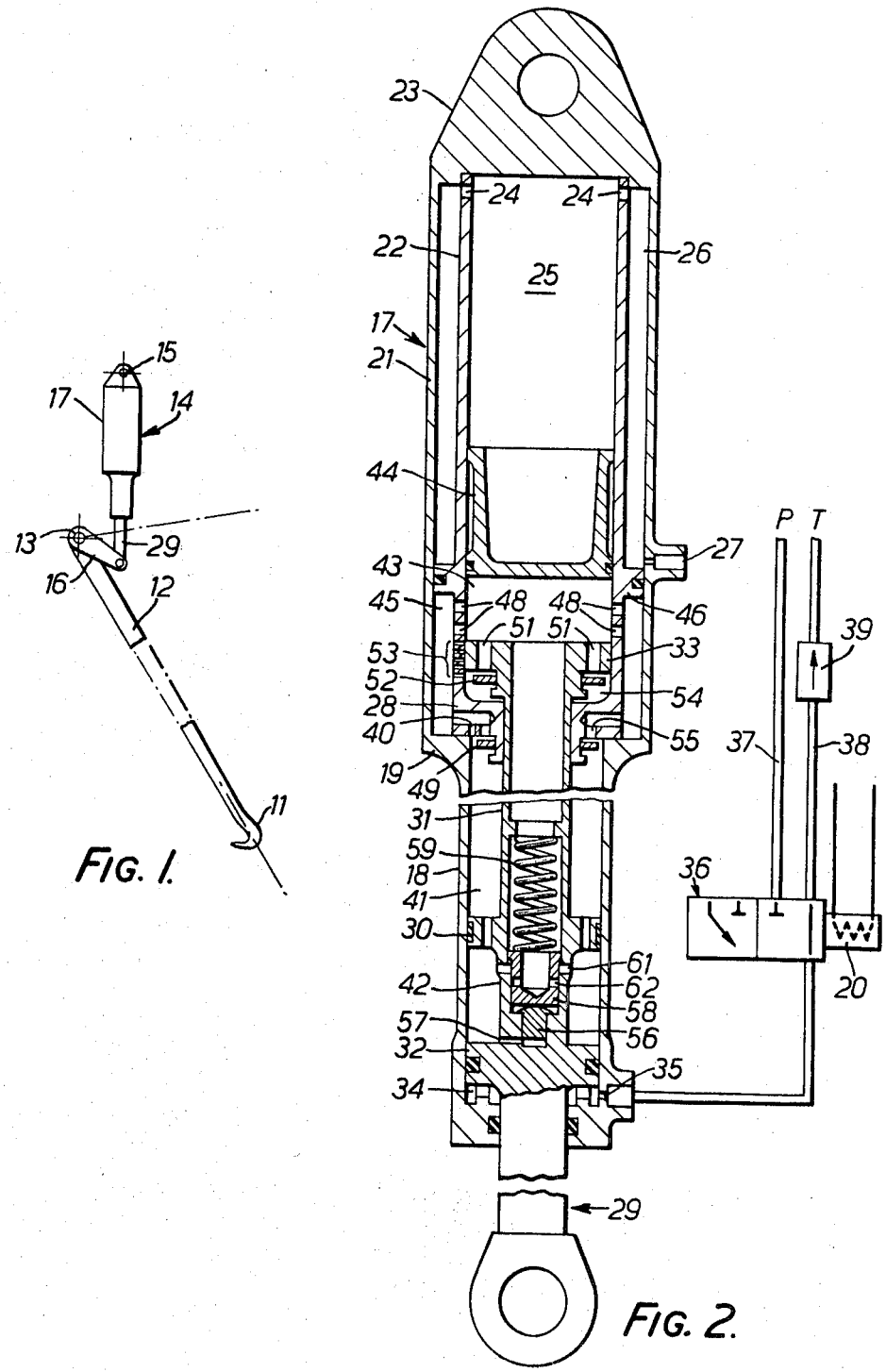

3,531,065
AIRCRAFT ARRESTING DEVICE
Reginald James Brown, Cheltenham, England, assignor to Dowty Rotol Limited
Filed Nov. 12, 1968, Ser. No. 774,948
Claims priority, application Great Britain, Nov. 13, 1967, 51,583/67
Int. Cl. B64c 25/68
U.S. Cl. 244—110          5 Claims

ABSTRACT OF THE DISCLOSURE

In aircraft arresting devices of the kind having a hook arm on the aircraft which is engageable with a cable extending across the landing surface, the hook arm is controlled by a telescopic jack and damper unit which contains a compressed gas spring acting to extend the unit for lowering the arm, and which is contracted by connecting an external source of high fluid pressure to a jack chamber in the unit for raising the arm. When the arm is in the lowered position of use, contraction of the unit by an upward load on the arm is resisted by damping means in the unit, while extension movement is undamped except for the ultimate extension movement, the latter being controlled by a snubbing device in the unit.

BACKGROUND OF THE INVENTION

Field of the invention

Aircraft arresting devices comprising a hook arm on the aircraft and an arresting cable on the landing surface.

Description of the prior art

A hook arm pivoted on the aircraft is raised and lowered by a double-acting hydraulic jack.

SUMMARY

The invention provides a telescopic jack and damper unit adapted to be interposed between an aircraft and an arrester hook arm which is pivotally attached thereto for movement between the aircraft and a lending surface provided with an arrester cable, the unit comprising a cylinder member having a pressure chamber containing liquid which is maintained under pressure by spring means, a first cylinder forming part of the cylinder member, a piston member movable in the cylinder member, a jack piston forming part of the piston member and together with the first cylinder defining a jack chamber having a connection through which hydraulic fluid from an external high pressure source is admissible to the jack chamber to move the piston member inwardly in the cylinder member to raise the arm, the jack piston and the first cylinder also defining a liquid-containing second chamber from which liquid is transferred to the pressure chamber when the piston member moves inwardly, and to which liquid returns under pressure in the pressure chamber to move the piston member outwardly when hydraulic fluid is released from the jack chamber, a second cylinder forming a part of the cylinder member, a counter-piston forming part of the piston member and together with the second cylinder defining a recoil chamber, non-return valve means admitting liquid from the pressure chamber to the recoil chamber during inward movement of the piston member but closing under the reverse flow, orifice means through which liquid is discharged from the recoil chamber to the second chamber during outward movement of the piston member, the counter-piston partially closing said orifice means towards the end of said outward movement whereby resistance to discharge of liquid retards the ultimate outward movement.

One embodiment of the invention is illustrated in the accompanying diagrammatic drawings, of which:

FIG. 1 shows the arrangement of an arrester hook arm and a jack and damper unit, and FIG. 2 is a sectional view of a jack and damper unit.

The arrester hook 11 is formed on the free end of an arm 12 which trails from a pivot 13 on the aircraft. The jack and damper unit 14 is pivotally interposed between a pivot 15 on the aircraft and a short lever arm 16 which is fast with the arm 12.

The unit 14 includes a cylinder member 17 having a first cylinder 18 connected by an annular step 19 to a cylinder wall 21 of greater diameter. A second cylinder 22 radially spaced from the cylinder wall 21 is located concentric with the first cylinder 18 between the step 19 and a cap 23 at the end of the cylinder wall 21. A flange 46 in the second cylinder 22 is sealed against the bore of the cylinder wall 21 to separate annular chambers 26, 45.

A piston 44 sealingly fitting the bore of the second cylinder 22 separates a pneumatic chamber 25 from a liquid-filled pressure chamber 43. The pneumatic chamber 25 is connected through apertures 24 in the cylinder 22 to the annular chamber 26, the latter being provided with a gas inflation valve 27 in the cylinder wall 21. The compressed gas acting on the piston 44 forms spring means which maintains liquid under pressure in the chamber 43. The presure chamber 43 is connected to the annular chamber through orifice means which comprises two axially spaced sets of orifices 48 providing minimal flow resistance and a row of axially spaced orifices 53 of smaller bore than the orifices 48.

The end of the second cylinder 22 adjacent to the step 19 is closed by a diaphragm 28 which abuts the step 19 and which has a central bore receiving a piston rod 31. The piston rod 31 is part of a piston member 29 which includes a jack piston 32 slidable in the first cylinder 18 and a counter-piston 33 slidable in the second cylinder 22. A apertured flange 30 is axially spaced from the jack piston 32, and it slides in the first cylinder 18 to provide additional bearing support for the piston member 29.

The first cylinder 18 and the jack piston 32 define a liquid-filled second chamber 41 from which liquid is expelled, during inward movement of the piston member 29 in the cylinder member 17, through a small orifice 40 in the diaphragm 28 to the chamber 45, and from there through the orifices 48 to the pressure chamber 43. An additional flow path from the chamber 41 is provided by a pressure relief valve 42 which is housed in the piston rod 31. This relief valve comprises a plunger 56 mounted in the piston rod 31 and exposed at one end to fluid pressure in the second chamber 41 by way of a drilled passage 57 in the piston rod. The other end of the plunger 56 abuts a piston valve 58 of larger diameter which slides in the piston rod 31 and which is loaded by a spring 59. Co-operating ports 61, 62 in the piston rod 31 and piston valve 58 respectively allow fluid flow from the chamber 41 through a hollow portion of the piston rod 31 to the pressure chamber 43 when the fluid pressure acting on the plunger 56 overcomes the load of the spring 59.

A clack valve between the chamber 41 and the chamber 45 is provided by a number of apertures 55 in the diaphragm 28 and a clack valve plate 49 which closes the apertures 55 under excess pressure in the chamber 41. The orifice 40 and the clack valve 49, 55 form damping means providing resistance to flow from the second chamber 41 but a lesser resistance in the reverse direction.

An annular recoil chamber 54 is formed between the diaphragm 28 and the counter piston 33. Another non-return valve is provided by a number of apertures 51 in the counter-piston 33 and a clack valve plate 52 which closes the apertures 51 under a pressure in the chamber 54 which exceeds that in the chamber 43.

The description thus far is of the parts necessary for the operation of the unit 14 as a damper.

For operation of the unit as a jack, a chamber 34 on the underside of the piston 32 is connected through a restrictor 35 to an electrically operated control valve 36, to which is also connected a high pressure supply line 37 and a low pressure return line 38 to tank having a non-return valve 39 therein. When the solenoid 20 which operates the valve 36 is passive, the valve is in the position shown connecting the chamber 34 to the low pressure return line 38. When the solenoid 20 is energised the valve 36 connects the high pressure supply line 37 to the chamber 34.

If, in operation, the hook 11 is to be raised to a retracted position in the aircraft, the valve 36 is energised to connect the high pressure line 37 to the chamber 34 whereby the piston member moves inwardly in the cylinder member 17. Liquid is discharged from the chamber 41, the clack valve 49 closing, through the orifice 40, the annular chamber 45 and the orifices 48 to the pressure chamber 43, thus further compressing gas in the chambers 25 and 26. The rate of flow from the pressure line 37 causes piston movement which is not substantially resisted by the orifice 40.

The axial spacing of the orifices 48 is such that when one of the rows of orifices is closed by the counter-piston 33, the other of the rows of orifices is substantially unrestricted. As the piston member 29 moves into the cylinder member 17, the separator piston 44 recedes towards the cap 23 and the counter-piston 33 travels up the second cylinder 22 beyond the orifices 48 and also towards the cap 23 though spaced from the separator piston 44.

The arm 12 may be secured in the raised position by an up-lock, not shown, after which the solenoid 20 is de-energised. The up-lock may be of known kind such as is used for retractable undercarriages. To lower the arm 12 in readiness for landing, the up-lock is released. The jack chamber 34 is already connected through the valve 36 to the low pressure line 38. The pneumatic pressure acts directly on the liquid in the chamber 43 and through the piston apertures 51, the orifices 48 and 53, the annular chamber 45, and the clack valve orifices 55 upon the piston 32, the rate of extension being controlled by flow of liquid from the chamber 34 through the restrictor 35.

When the piston member 29 has moved outwardly so far that the counter-piston 33 closes the lower row of orifices 48, discharge of liquid from the recoil chamber 54 continues through the smaller orifices 53 which are progressively closed.

Then the piston member 29 reaches the end of its outward travel in the cylinder member 17, the arm 12 is in its lowered position in readiness for landing. Upon touch-down, the arm 12 may be partially raised with respect to the aircraft by contact with the deck so that liquid is discharged from the second chamber 41 either through the small orifice 40 alone, and the annular chamber 45 to the pressure chamber 43, or, in the case of rapid closure of the unit 14, through the pressure relief valve 42 also. Any tendency of the arm 12 to bounce off the deck is limited by the flow-resistance of the orifice 40 and the relief valve 42, together with the pneumatic chamber pressure. During movement of the piston member 29 into the cylinder member 17, low pressure liquid is prevented by the non-return valve 39 from entering the chamber 34, which is expanding, so this chamber cavitates.

Return movement of the arm 12 is accomplished by pneumatic pressure in the chambers 25 and 26 which expels liquid from the chamber 43 through the orifices 48, the annular chamber 45, and the clack valve orifices 55 to the chamber 41. The apertures 51, the orifices 48, and the apertures 55 cause little if any appreciable damping. Moreover, there is no liquid in the chamber 34, so that the restrictor 35 has no effect upon the rate of extension. The unit 14 therefore returns the arm 12 rapidly to the deck after the arm has bounced, or lifted over any minor obstruction on the deck. Any risk of failure to engage an arresting cable is therefore reduced.

This substantially undamped movement occurs over the larger part of the recoil stroke of the unit 14, but if this is free to extend fully, there is damping or snubbing of the ultimate extension movement by the orifices 53 and the counter-piston 33. When this piston closes the apertures 48, liquid is partially trapped in the chamber 54, whereupon a pressure higher than that in the chamber 43 is developed in the chamber 54, causing the clack valve plate 52 to close on the apertures 51. Discharge of liquid from the chamber 54 then takes place through the orifices 53 which are closed successively by the counter-piston 33 whereby the ultimate outward movement of the piston member 29 is retarded. This snubbing action also occurs when the aircraft is airborne and the arm 12 is lowered, or if the aircraft overshoots the deck.

When the hook 11 engages the arresting wire, the plane containing the lengths of cable on opposite sides of the hook 11 and the arm 12 tend to move into a common inclined direction along which a restraining pull is exerted on the aircraft. The downward component of this pull compresses the shock absorbers of the main landing gear of the aircraft whereby the arm 12 moves upwardly with respect to the aircraft. This movement will occur rapidly, but the resulting pressure surge in the chamber 41 is limited by opening of the relief valve 142.

The form in which this relief valve is constructed, wherein the pressure acts on the plunger 56 and the valve ports 62 are in a piston valve of larger diameter, provides a high flow capacity without the use of valve parts and a spring of undue size.

I claim:

1. A telescopic jack and damper unit adapted to be interposed between an attachment on an aircraft and an attachment on an arrester hook arm which is pivotally connected to the aircraft for movement between the aircraft and a landing surface provided with an arrester cable, the unit comprising a cylinder member connected to one of said attachments and having a pressure chamber containing liquid which is maintained under pressure by spring means, a first cylinder forming part of the cylinder member, a piston member connected to the other of said attachments and movable in the cylinder member, a jack piston forming part of the piston member and together with the first cylinder defining a jack chamber having a connection through which hydraulic fluid from an external high pressure source is admissable to the jack chamber to move the piston member inwardly in the cylinder member to raise the arm, the jack piston and the first cylinder also defining a liquid-containing second chamber from which liquid is transferred to the pressure chamber when the piston member moves inwardly, and to which liquid returns under the pressure in the pressure chamber to move the piston member outwardly when hydraulic fluid is released from the jack chamber, a second cylinder forming a part of the cylinder member, a counter-piston forming part of the piston member and together with the second cylinder defining a recoil chamber, non-return valve means admitting liquid from the pressure chamber to the recoil chamber during inward movement of the piston member but closing under reverse flow, orifice means through which liquid is discharged from the recoil chamber to the second chamber during outward movement of the piston member, the counter-piston partially closing said orifice means towards the end of said outward movement whereby resistance to discharge of liquid retards the ultimate outward movement.

2. A telescopic jack and damper unit according to claim 1, wherein the orifice means comprises a number of axially spaced orifices formed in the second cylinder so as to be progressively closed by the counter-piston during ultimate outward movement of the piston member.

3. A telescopic jack and damper unit according to claim 1, having damping means providing resistance to flow from the second chamber to the pressure chamber, but a lesser resistance to flow from the recoil chamber to the second chamber.

4. A telescopic jack and damper unit according to claim 3, including a pressure relief valve disposed in the piston member between the second chamber and the pressure chamber, the relief valve discharging liquid from the second chamber to the pressure chamber when the pressure across the damping means exceeds a predetermined value.

5. A telescopic jack and damper unit according to claim 1 including a control valve operable to connect the jack chamber either to the high pressure source or to a low pressure return, a restrictor in the connection to the jack chamber, and a non-return valve in the low pressure return.

References Cited

UNITED STATES PATENTS

| | | | |
|---|---|---|---|
| 2,668,031 | 2/1954 | Martin et al. | 244—110 |
| 2,679,827 | 6/1954 | Perdue | 92—8 |
| 3,415,159 | 12/1968 | Hornlein et al. | 92—134 XR |

MILTON BUCHLER, Primary Examiner

P. E. SAUBERER, Assistant Examiner

U.S. Cl. X.R.

91—402, 422; 92—8, 134; 188—100